No. 884,275. PATENTED APR. 7, 1908.
D. H. HAYWOOD.
HEAT REGULATING APPARATUS.
APPLICATION FILED JULY 28, 1906.
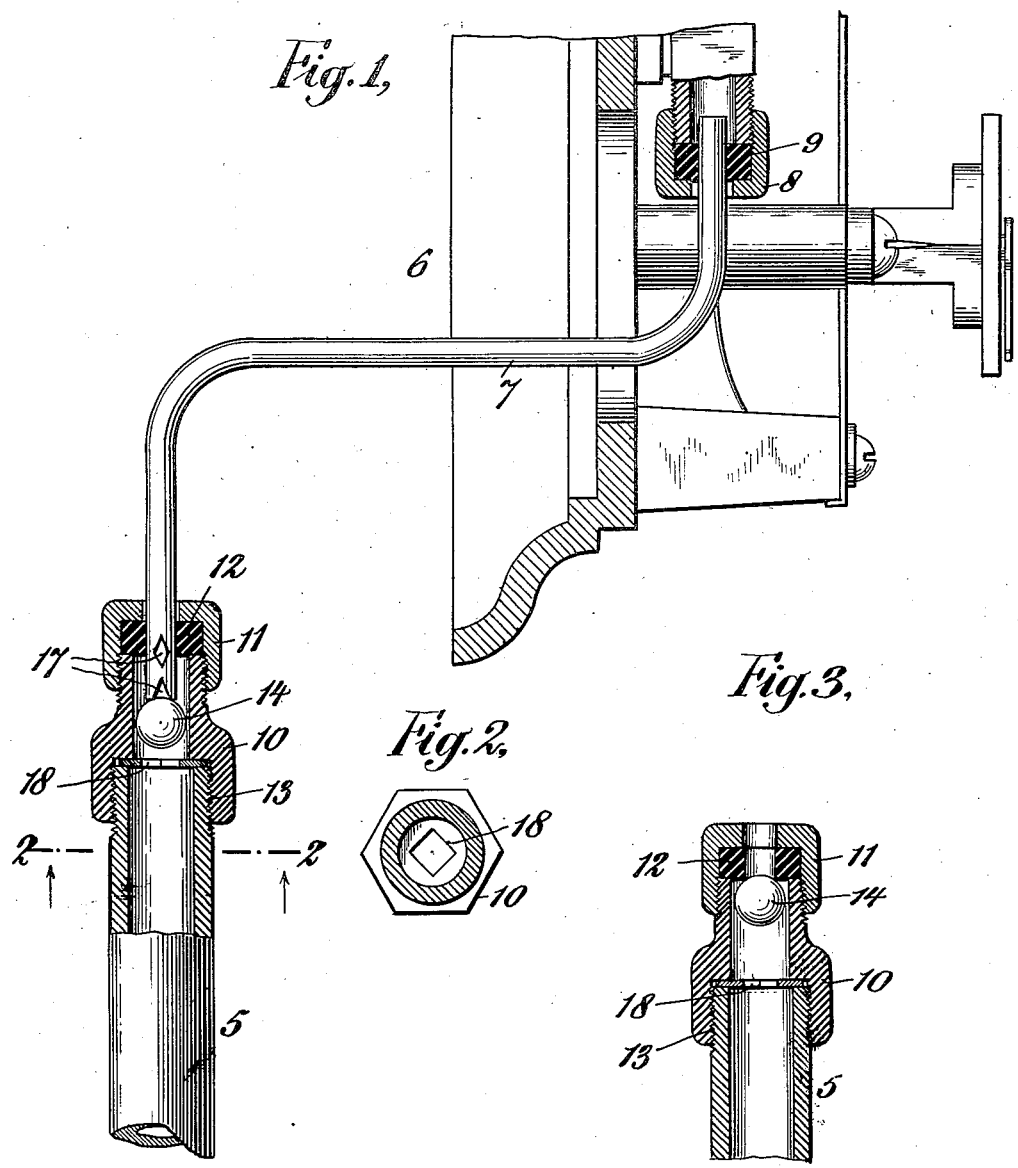
WITNESSES:
INVENTOR
BY
his ATTORNEYS

UNITED STATES PATENT OFFICE.

DANIEL HOWARD HAYWOOD, OF NEW YORK, N. Y., ASSIGNOR TO WILLIAM B. WADSWORTH, OF PLAINFIELD, NEW JERSEY.

HEAT-REGULATING APPARATUS.

No. 884,275.   Specification of Letters Patent.   Patented April 7, 1908.

Application filed July 28, 1906. Serial No. 328,221.

*To all whom it may concern:*

Be it known that I, DANIEL HOWARD HAYWOOD, a citizen of the United States of America, and resident of the borough of Manhattan, city of New York, county and State of New York, have invented certain new and useful Improvements in Heat-Regulating Apparatus, of which the following is a specification, reference being had to the accompanying drawings, forming a part thereof.

My invention relates to improvements in heat regulating apparatus, and particularly to improvements in pipe connections for heat regulating apparatus operated by pneumatic pressure. In this form of apparatus, the main pipe or conduit is usually embedded in the wall, while a heat regulating device, usually known as a "thermostat," and which includes valve means operated by compressed air delivered through the said conduit, is secured to the surface of the wall. It becomes necessary, then, to make a connection between the valve mechanism of the thermostat and the said conduit, and this connection is preferably of such form that it may be readily broken and re-made, when desired, so that the thermostat may be easily removed and replaced at any time. In breaking this connection, provision has to be made for shutting off escape of air from the conduit, as otherwise great waste would occur. In order to provide for thus shutting off the air, I have devised automatic means operated by removal of the short piece of pipe usually employed as a part of the coupler or connection, said means opened again by the mere putting in place of the said pipe connection, whereby the closing of the pipe against passage of air, and the opening of same, is automatically carried out by the mere insertion and removal of the coupling part which forms the pipe connection.

In order that my invention may be fully understood, I will proceed to describe an embodiment thereof, and will then point out the novel features in claims.

In the drawings—Figure 1 is a view in central longitudinal section through a main conduit, a portion of a thermostat, and a coupling and valve constructed in accordance with my invention. Fig. 2 is a detail transverse sectional view substantially upon a plane of the line 2—2 of Fig. 1. Fig. 3 is a view in central longitudinal section of the coupling and valve with the pipe connection removed.

Referring to the parts by reference characters, 5 designates a main pipe or conduit, which is intended to connect with the main source of supply.

6 designates a thermostat, in which pneumatic pressure is employed. A short section of piping 7 of small diameter is employed to connect the thermostat 6 with the conduit 5, as is shown, the said pipe 7 being connected with the thermostat 6 by means of a screw cap 8 and rubber washer 9, while the said piece of pipe 7 is connected at its opposite end with the main conduit 5 by means of a coupling member 10, to which the pipe 7 is secured by means of a similar cap 11 and an elastic washer 12, the coupling member 10 itself secured to the main pipe or conduit 5 by a screw threaded connection 13. Air under pressure normally passes freely along the conduit or pipe 5 through the coupling member 10 on the pipe 7 into the thermostat 6. The coupling member 10, however, is provided with a valve in the form of a sphere 14, which is loosely contained therein, the diameter of said sphere being preferably but slightly smaller than the inner diameter of the member 10. The air coming under pressure through the pipe or conduit 5 tends to carry the sphere or ball 14 upward, but the upward movement of the said ball is opposed by the lower end of the pipe 7. If the pipe 7 be removed, the ball 14 will be allowed to come up against the elastic washer 12, whereby escape of air will be cut off at this point, the said elastic washer acting as a valve seat for the ball valve 14. The lower end of the pipe 7 is preferably provided with recesses, either at the extreme end, or near the end, as at 17, said recesses conveniently formed by making a small file cut, or file cuts, at this part, whereby the said ball will not prevent air from passing up through the pipe 7, when the pipe 7 is in place, as shown in the drawings. A washer 18 may be conveniently employed to prevent the ball from dropping into the pipe, though, if the opening of the pipe is small enough to prevent the ball from so dropping down, this washer may be dispensed with. It will be readily seen, then, that immediately the pipe 7 is removed, passage of air from the coupler 10 will be cut off, while the mere insertion of the pipe, which will act to push the ball 14 away from the washer 12, will serve to break the seal, and air will then flow freely, as before. The ball 14 may be of any desired material, such as rubber, metal or the like, and is preferably of a diameter but slightly smaller than the portion of the socket or coupler member 10 carrying it, whereby the tendency of the ball to move upward under the influence of the air is increased, due to the friction of the air rushing along the narrow annular space around the ball. This space may be, of course, varied, and, indeed, it may be considerable, if desired, as by reason of the jet of air from the pipe 5 being directed towards the center of the ball, there will be considerable tendency of the ball to lift, in any event. Once the ball engages the seat, there will, of course, be the entire pressure of the pipe back of it to hold it in place, so that no vibration or the like will be liable to dislodge it, until it is positively removed by the insertion of the pipe 7.

What I claim is:

1. In heat regulating apparatus, the combination with a main pipe or conduit, a coupling member, a pipe adapted to connect said coupling member with a thermostat, means for securing said pipe to said coupler, comprising a screw cap and an elastic washer, and a ball contained within said coupling member arranged to engage said elastic washer when the said pipe is removed, but to be disengaged therefrom when the said pipe is in position, said pipe having openings adjacent the end, whereby the said ball will not prevent air from passing therethrough when the said pipe is in position, substantially as set forth.

2. In heat regulating apparatus, the combination with a main pipe or conduit and a pipe adapted to connect with a thermostat, of a coupling member having a screw-threaded connection with said main pipe or conduit, a washer having a reduced orifice arranged over the end of said pipe or conduit and held in place by the said coupling member, an elastic washer fitted around the second said pipe, a screw cap for clamping said elastic washer to the said coupling member and for pressing same around the pipe upon which it is arranged, a ball valve arranged in said coupling member and held away from the said elastic washer when the second said pipe is in place, said pipe having cut away portions whereby the said ball valve will not close the same, said ball valve adapted to engage the said elastic washer when the second said pipe is removed, said elastic washer then constituting a valve seat for the said ball, substantially as set forth.

In witness whereof, I have hereunto set my hand this 19th day of July, 1906.

D. HOWARD HAYWOOD

Witnesses:
　WILLARD WADSWORTH,
　LYMAN S. ANDREWS, Jr.